Feb. 8, 1938.                H. K. F. EWALD                    2,107,374
              DEVICE FOR CALCULATING MACHINES, ACCOUNTING
                  MACHINES, WRITING AND LIKE MACHINES
                        Filed Aug. 13, 1935        6 Sheets-Sheet 1

Inventor:
H. K. F. Ewald
By Bonnelyle Young Emery Thagan
Attorneys

Feb. 8, 1938. H. K. F. EWALD 2,107,374
DEVICE FOR CALCULATING MACHINES, ACCOUNTING
MACHINES, WRITING AND LIKE MACHINES
Filed Aug. 13, 1935 6 Sheets-Sheet 2

Inventor:
H. K. F. Ewald
By
Attorneys

Inventor:
H. K. F. Ewald

Feb. 8, 1938.	H. K. F. EWALD	2,107,374
DEVICE FOR CALCULATING MACHINES, ACCOUNTING
MACHINES, WRITING AND LIKE MACHINES
Filed Aug. 13, 1935	6 Sheets-Sheet 4

Feb. 8, 1938.    H. K. F. EWALD    2,107,374
DEVICE FOR CALCULATING MACHINES, ACCOUNTING
MACHINES, WRITING AND LIKE MACHINES
Filed Aug. 13, 1935    6 Sheets-Sheet 6

Inventor:
H. K. F. Ewald
By Bonnelyde Young Duey & Thompson
Attorneys

Patented Feb. 8, 1938

2,107,374

UNITED STATES PATENT OFFICE 2,107,374

DEVICE FOR CALCULATING MACHINES, ACCOUNTING MACHINES, WRITING AND LIKE MACHINES

Heinrich Konrad Friedrich Ewald, Chemnitz, Germany, assignor to Wanderer-Werke vorm. Winklhofer & Jaenicke Akt.-Ges., Schonau-Chemnitz, Germany Application August 13, 1935, Serial No. 36,010
In Germany August 17, 1934

28 Claims. (Cl. 197—127)

The invention relates to a device for adjusting sheets of paper to any desired line in calculating machines, accountancy machines, writing and like machines.

The object of the invention is to provide a device of the said kind by means of which the sheets, especially such as are inserted into the machine from the front, can be adjusted accurately, quickly and in a simple manner to a desired line of writing.

Typical embodiments of the invention are illustrated in the annexed drawings, in which:—

Figure 1:
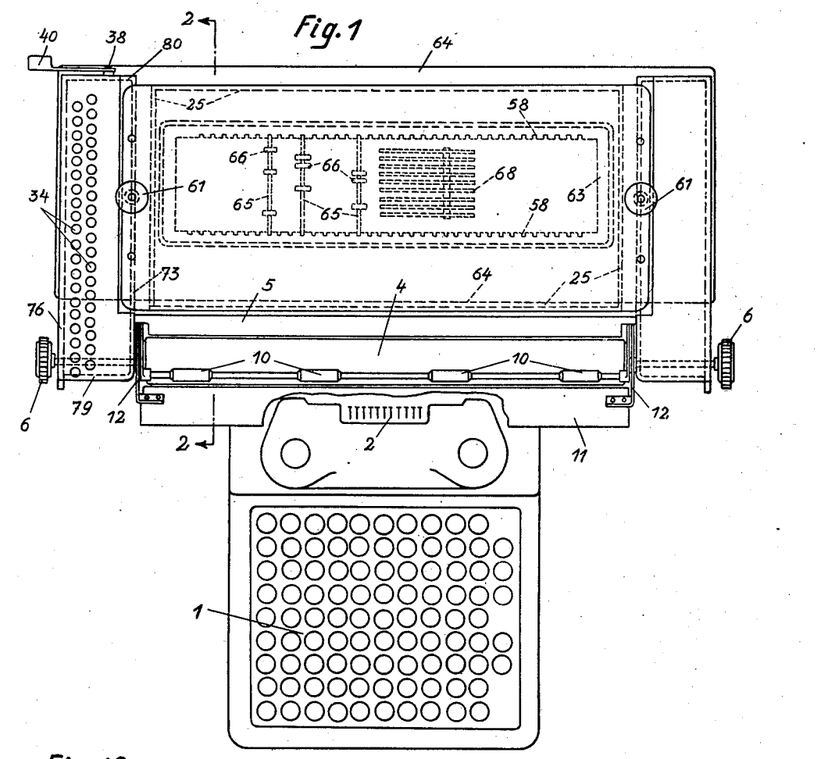
Fig. 1 is a plan of a calculating machine, fitted with a device according to the invention.
Figure 2:
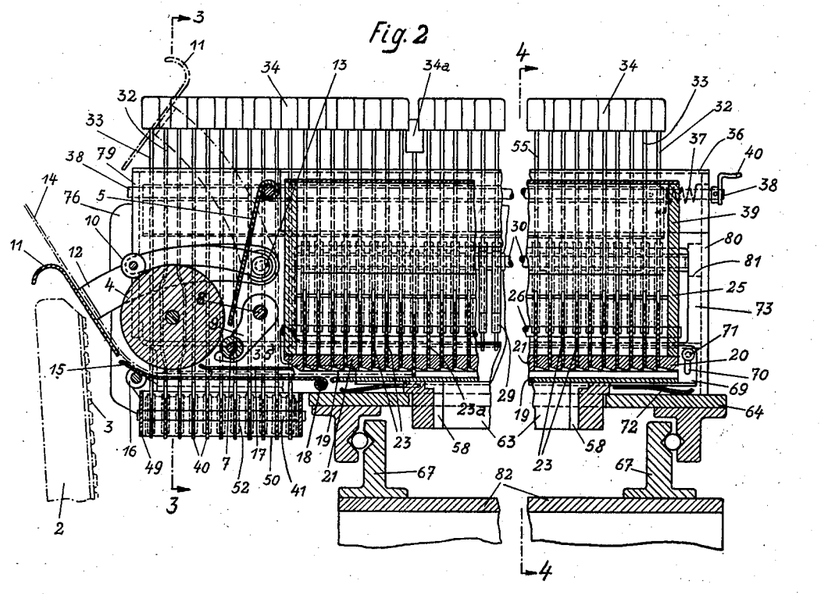
Fig. 2 is a section along the line 2—2 in Fig. 1.

In Fig. 1, the invention is shown by way of example as applied to a calculating machine. The keyboard (for example, a full keyboard) is indicated by 1, the type bars by 2 and the type characters mounted thereon by 3 (Fig. 2). The platen 4 is provided with turning knobs 6 and, preferably, with a feed plate 5 serving to lead the writing sheets behind the platen. For effecting the forward movement of said sheets, presser rollers 7 are provided, which are mounted on levers 9 secured on a rotatable axis 8. Upper presser rollers 10 enable the inserted sheets to be written on almost down to their bottom edge.

For inserting the sheets of paper in front of the platen 4, a feed plate 11 is provided which, when a book-keeping machine of the kind described is employed, is preferably adapted to be swung on pivots 13 by means of lateral arms 12, and can be tipped up automatically or by hand into a top position indicated by broken lines in Fig. 2. In its bottom position, the feed plate 11 forms, in conjunction with the forward portion of the platen 4, a funnel into which one or more sheets of paper can be conveniently inserted from the front. The sheets can be inserted by hand or by mechanical means. Following the feed plate 11 is a plate 15 for the further guidance of the sheets 14. The plate 15 is bent slightly forward at its front end and is provided with gaps through which presser rollers 16 partially project. Disposed above the plate 15 is another plate 17 for the purpose of preventing the front edge of the paper sheet 14 from being deflected during its insertion. The plates 15 and 17 form a preferably horizontal passage in which the sheets 14 are guided during their continued advance.

The sheets 14 are held in position for writing by the presser rollers 16 which can be pressed against the platen 4 in a convenient manner. The upper portion of the sheets 14 is pressed firmly against the platen 4 by means of the upturned feed plate 11, or by rollers or other convenient retaining means.

Figure 3:
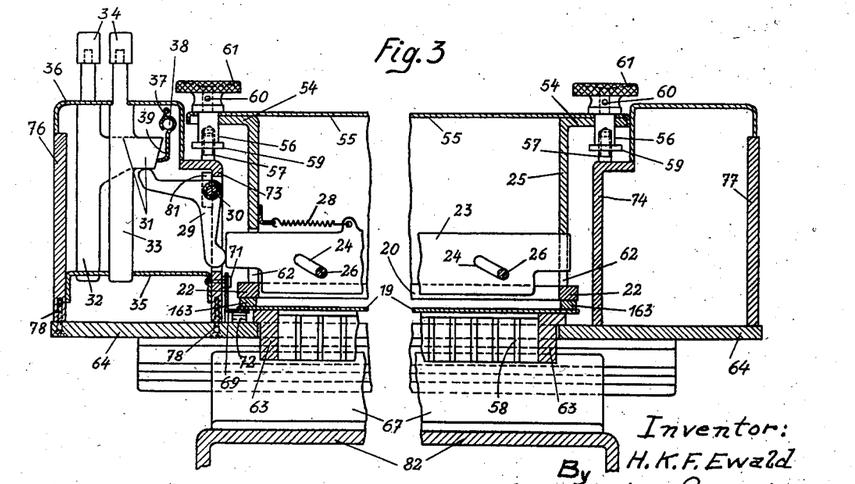
Fig. 3 is a section along the line 3—3 in Fig. 2.

The rear end of the plate 15 is attached to a rod 18. In order to prolong the passage 15, 17 the plate 15 is succeeded by a plate 19, facing which is a plate 20 forming an extension of the top plate 17. The plate 20 is divided by means of longitudinal slits into a number of bars 21, the ends of which are held together by cross pieces 22, as shown in Fig. 3. The bars 21 are chamfered at their lower edges to prevent the advancing sheets 14 from catching against the said edges and thus becoming checked. Projecting into the longitudinal slits between the bars 21 are the lower ends of stops 23 designed as flat bars. As shown in Fig. 3, the stop bars 23 are provided with slits 24 through which are passed rods 26 or pins mounted in a frame 25. The slits 24 and rods 26 form guides for the stops 23, to ensure parallel displacement. The slits 24 are preferably oblique, thus compelling the stops 23 to become displaced in their longitudinal direction conjointly with their vertical movement. Consequently, the rise and fall of the stops 23 can be effected, in a simple manner, by pushing them in their longitudinal direction. The frame 25 may be provided with slits 62, for the further guidance of the stops 23.

The longitudinal displacement of the stops 23 is effected by bell-crank levers 29 (Fig. 3), which are pivotally mounted on a rod 30 and abut against the end surfaces of the stops 23. The forward ends of the horizontal arms of the levers 29 extend under lateral lugs 31 of key stems 32 and 33 which are guided between upper and lower guiding members 35 and 36 and carry the keys 34 on their upper ends.

The lugs 31 have an oblique lateral edge on which bears a locking rail 39, the axis 38 of which is rotatably mounted in a front wall 79 and a rear wall 80, and pressed against the lugs 31 by a spring 37. A release key 40 (Figs. 1 and 2) is attached to the rear end of the axis 38.

The depression of any convenient key 34 turns a bell-crank lever 29 towards the left by means of the corresponding lug 31 and thus pushes the corresponding stop bar 23 towards the right against the action of the spring 28. Through the oblique guidance of the stops 23, by means of the slits 24 and pins 26 (Fig. 3), said stops also are depressed, the lower rim of the corresponding stop 23 thereby coming under the lower edge of the plate 20. In the embodiment shown, the stroke of the key 34 is long enough to enable the lower edge of the stop 23 to pass just as far as the lower plate 19. In this position of the stop bar 23 the check rail 39 bears, under the action of the spring 37, on the upper edge of the lug 31 of the key that has been depressed, so that the spring 28 can no longer return the stop bar 23 towards the rear. The spring 28 cannot return the adjusted members to their neutral position until another key 34 has been depressed, thereby again causing the check rail 39 to turn towards the left, or until a left turn has been imparted to the check rail 39 by the release key 40.

The connection between the keys 34 and the stops can also be effected in a positive manner by springs in such way as to cause the stop bar 23 to abut against the lower plate 19 before the check rail 39 is in the locking position. This result can be obtained, for example, by enlarging the lateral lugs 31 and stop bars 23. Said springs are preferably more powerful than the springs 28. In such a case if a key 34 is depressed none of said springs is deflected until the corresponding stop bar 23 bears on the lower plate 19. With this construction, a satisfactory bearing of the stop bars 23 on the lower plate 19 can be obtained with certainty, even when the individual members are designed with insufficient precision. In order not to impair the clarity of the drawing, such a possible arrangement has not been illustrated in this embodiment.

In Fig. 2, a key 34a is shown in the depressed position, the corresponding stop bar 23a being in its bottom position. A sheet of paper 14 inserted over the front feed plate 11 can thus be passed into the passage 15, 17, 19, 20 as far as the stop bar 23a, which corresponds to a definite line on the sheet 14. In the same manner as a stop bar 23a can be depressed by the key 34a, the corresponding stop bars can also be depressed, in each case, by the other keys 34, so that by means of the present device the inserted sheets 14 can be set to any desired line of writing. The keys 34 are preferably provided with cyphers or characters each of which corresponds to the line to which they set the sheets 14.

Figure 4:
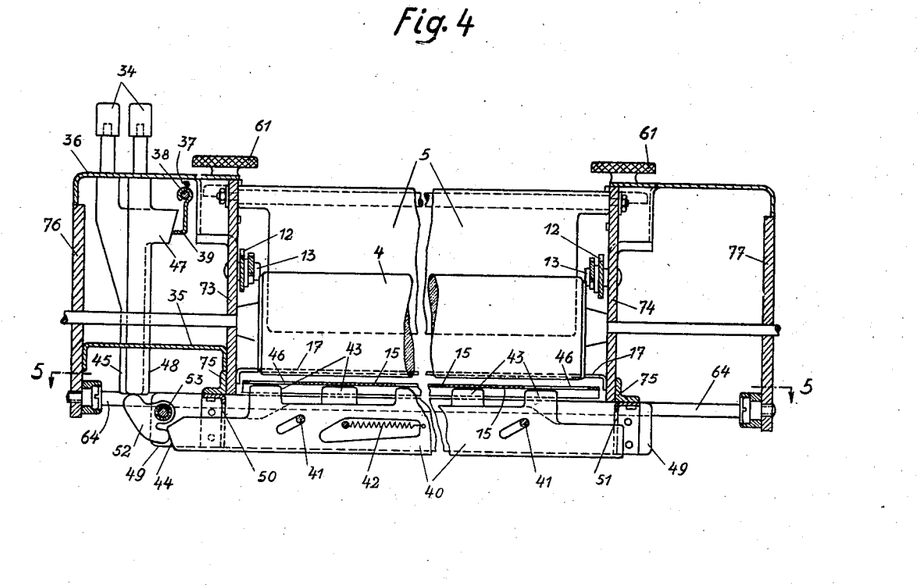
Fig. 4 is a section along the line 4—4 in Fig. 2.
Figure 5:
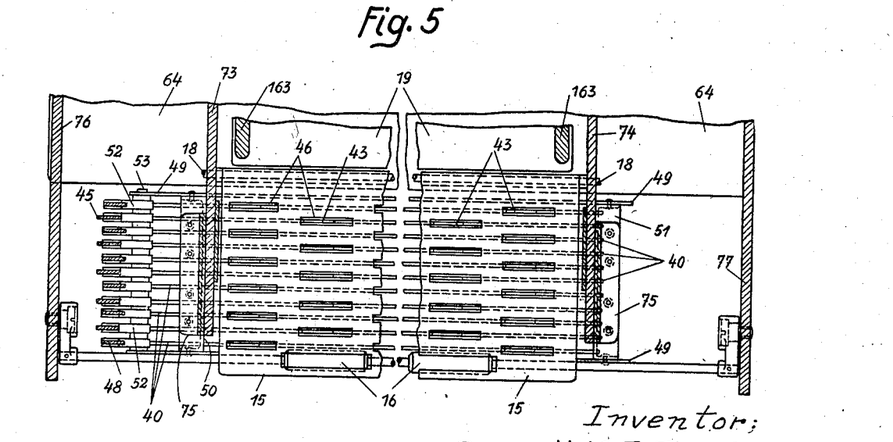
Fig. 5 is a section along the line 5—5 in Fig. 4.

The front passage members 15, 17 (Fig. 2) adjacent to the platen 4 are fitted with stop bars 40 which, as shown in Figs. 4 and 5, are guided by lateral combs 50, 51 and also by slits and pins 41. The stop bars 40 are held downwards towards the left by springs 42. The upper edges of the stop bars 40 are provided with a plurality of projections 43 which in the neutral position remain below the upper edge of the plate 15 and thus allow the sheets 14 free passage through the opening 15, 17. Owing to the oblique slits and the pins 41, the stop bars 40 can be pushed up, parallel and towards the right, against the action of the springs 42. In the present instance the displacement is effected by levers 52 bearing against the left surfaces 44 and loosely rotatable on an axis 53, said levers being actuated by the key stems 45, 46 of the keys 34 adjacent to the platen 4. During the displacement of a stop bar 40, its projections 43 pass through corresponding gaps 46 in the plate 15, and therefore stop the sheet 14 that has been inserted in the passage 15, 17 directly said sheet has reached the desired line of writing. Consequently, the front stop bars 40 enable the sheets 14 to be adjusted quickly and reliably to any writing line in the same manner as is done by the stop bars 23 of the rearward portion 19, 20 of the passage. The stops 40 can be brought close up to the impression point of the platen as to enable writing to be applied to the sheets 14 to near their lower edge.

In Figs. 4 and 5, the gaps 46 and projections 43 for successive lines are relatively offset, thus facilitating the passage of the sheets 14 over the plate 15.

After one or more sheets have been inserted, the presser rollers 16 are moved, automatically or by hand, from their bottom position towards the platen 4, in order to press the sheets against the latter. This is preferably performed by a further movement of the same control member which lifts or detaches the rear presser rollers 7 during part of its stroke.

The key stems 45, 46 are provided with lateral lugs 47, which are connected with the check rail 39 and release key 40 in the same manner as is done by the lugs 31 of the key stems 32, 33 in Fig. 3.

The pins 41 and the axis 53 of the lever 52 are mounted on a frame 49 which forms with the combs 50, 51 a complete unit and, as shown in Figs. 2 and 3, is detachably connected by means of brackets 75 to side walls 73, 74 mounted on the base plate 64 of the paper carriage. Consequently, the frame 49 together with the stop bars 40 and levers 52 can be bolted on to and removed from the paper carriage as a structural unit.

The box-shaped frame 25 (Figs. 2 and 3) is provided with lateral flange members 54, over which a cover plate 55 is laid. Nuts 56, screwing on to threaded bolts 57 on the side walls 73, 74 of the paper carriage, pass through openings in the flanges 54 and cover plate 55. The buttons 61, set on an upper extension of the nuts 56, are secured by pins 60. The nuts 56, 61 are also provided with lower rims 59, so that by unscrewing and lifting the nuts the frame 25 and the inbuilt stop rods 23 can be easily taken off the paper carriage as a complete unit.

The frame 25 is also connected with the plate 20, lateral fillets 163 (Fig. 3) and bottom plate 19. In the example shown, the plate 19 rests on a rectangular rider frame 63 inserted in an opening in the base plate 64 of the paper carriage. As shown in Figs. 1, 2 and 3, the frame 63 is provided with notches 52 into which fit correspondingly shaped ends of rider carriers 65. Said carriers 65 are adapted for the insertion of riders or paper-carriage stops 66 (Fig. 1), by means of which the various counting mechanisms of the calculating machine can be selected and set in accordance with their tasks, such as addition, subtraction or non-addition. The control members coacting with the paper-carriage stops 66, in the present case, double-armed levers 68 (Fig. 1), are disposed between the guides 67 (Fig. 2) of the paper carriage and are provided with connections to the corresponding control arrangements in the interior of the calculating machine. The entire detachable top part, consisting of the frame 25, with the stop bars 23, fastening device 56, 61, plate 20 and plate 19, thus forms an easily removable top cover for the rider frame 63, the riders 66 and rider carriers 65 being, therefore, easily accessible. The said upper cover of the rider frame 63 also serves to secure the riders or paper-carriage stops 66, resting on the plate 19, in their position of adjustment for the time being.

As shown in Fig. 3, an angular slider 69 engages, with its horizontal limb 69, under the left end of the plate 19. According to Fig. 2 the vertical limb of the slider 69 is provided, at both ends, with slits 70 engaging pins 71. On the under side of the slider 69 are mounted springs 72 which continuously tend to raise the slider 69 from the position shown. On the removal of the frame 25 and plate 19, the slider 69 is free to rise under the action of said springs 72. In its top position, the slider 69 applies itself, by means of its vertical limb, in front of the lower arms of the bell-crank lever 29, so that, after the removal of the frame 25, springs 28 and stop bars 23, the said levers 29 cannot turn towards the left.

In addition to the two interior side walls 73, 74 the paper carriage has two outer side walls 76, 77. In the embodiment shown the side walls 76, 73 are detachably connected to the base plate 64 of the paper carriage—as indicated, by bolts 78, in Fig. 3. The guide plates 35, 36 for the key stems 32, 33 and 45, 48 are connected to the side walls 76, 73 by means of lateral flanges. The rotatable rod 38 is mounted in a front wall 79 and a rear wall 80, these walls being attached (Fig. 2) to the side walls 76, 73. The bearings 81 for the rod 30 carrying the bell-crank levers 29, are mounted on the side wall 73. Consequently, after the left journal of the platen 4, and the screws 78 have been unscrewed, the entire portion containing the keys can be removed from the paper carriage as a complete structural unit.

The device according to the invention is shown, fitted to a calculating machine with carriage guides 67, disposed in a horizontal plane independently of the main portion of the machine, on a frame 82 set up on the base plate of the machine. The arrangement is naturally also applicable in the case of obliquely or vertically disposed paper carriage guides. The arrangement can also be applied when the platen or other means for receiving the impact of the impression is not adapted to slide in the longitudinal direction of the lines of writing.

Figure 6:
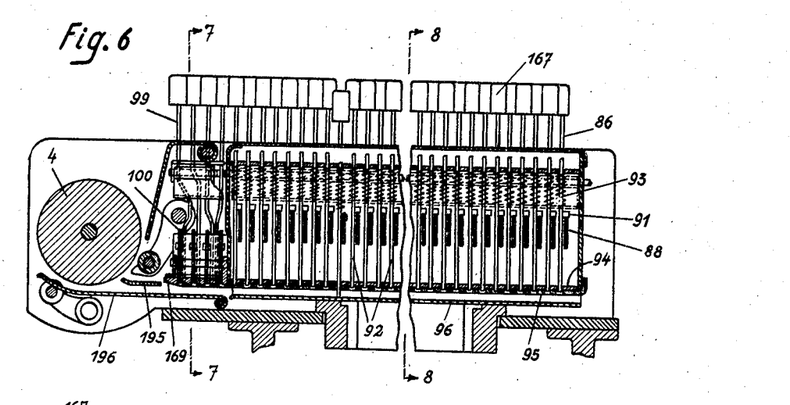
Fig. 6 represents another embodiment of the invention and is a section corresponding to Fig. 2.
Figure 7:
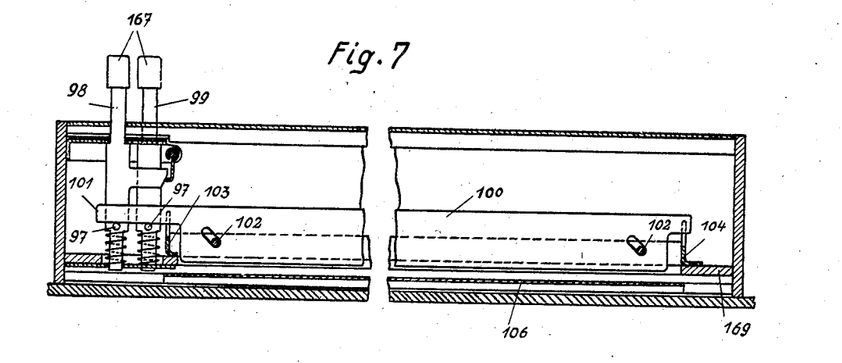
Fig. 7 is a section along the line 7—7 in Fig. 6.
Figure 8:
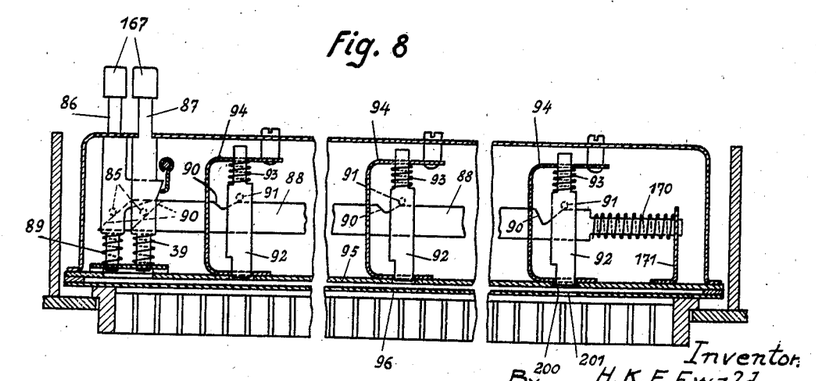
Fig. 8 is a section along the line 8—8 in Fig. 6.

Figs. 6–8 show another embodiment of the invention. As shown in Fig. 8, the keys 167 arranged on a paper carriage are connected with oblique surfaces 90 of bars 88, by pins 85 on the key stems 86, 87. The bars 88 are guided, so as to be longitudinally displaceable in corresponding gaps in guide plates 94, 171. The oblique surfaces 90 of the bars 88 are kept pressed against the pins 85 by springs 170. When a key is depressed against the action of a spring 89 the bars 88 in Fig. 8 can, therefore, be moved towards the right. During this movement, curved notches 190 in the bars 88 release pins 91 on sliders or stops 92, so that said stops 92 can descend by gravity or by means of springs 93, in guides in the channel-section guide plates 94. In descending, the lower ends of the stops 92 enter the passages formed by the plates 95 and 96. The notches 190 are preferably of somewhat greater depth than that corresponding to the stroke of the stops 92, thereby assuring a good contact between the stops 92 and the plate 96, and thus preventing an inserted sheet from being unintentionally pushed under the stops 92 by reason of any unevenness of the plate 96. The latter can, of course, also be provided with gaps 201 or the like, to accommodate the lower ends of the stops 92, as shown by way of example on the right of Fig. 8.

In such of the keys 167 (Fig. 6) as are situated nearer the platen 4, pins 97 are provided on the key stems 98, 99 (Fig. 7) below lateral lugs 101 of the stop bars 100. By this means, if a key 167 and the corresponding pin 97 is depressed, the stop bars 100 which are guided by means of slits and pins 102 and in lateral racks 103, 104 can descend by gravity in order to retain the inserted sheet at a desired line, for example in the forward portion of the passage formed by the plates 195, 196 and a slotted plate 169. The descent of the stop bars 100 can also be effected by the action of springs or other suitable means.

When several different lines are to be written simultaneously on several sheets of paper, it is preferable, in the first place, to insert such sheets as are to penetrate furthest into the passage 195, 196, 95, 96 and lead them up to the corresponding stops. The stops that are situated nearer the front and to serve the sheets that are to be inserted less deeply are then actuated by means of the corresponding keys, and the said sheets are inserted as far as these last stops. Through this later adjustment of the front stops, the rear stops, which were actuated in the first place can be retained in their operative position by means of their keys. For such operations with several sheets to be inserted at different depths into the passage, it is of particular advantage to employ such stops as—like the stops 92 in Figs. 6 and 8—encounter the sheets 14 in the passage 95, 96 perpendicularly in each direction.

Figure 9:
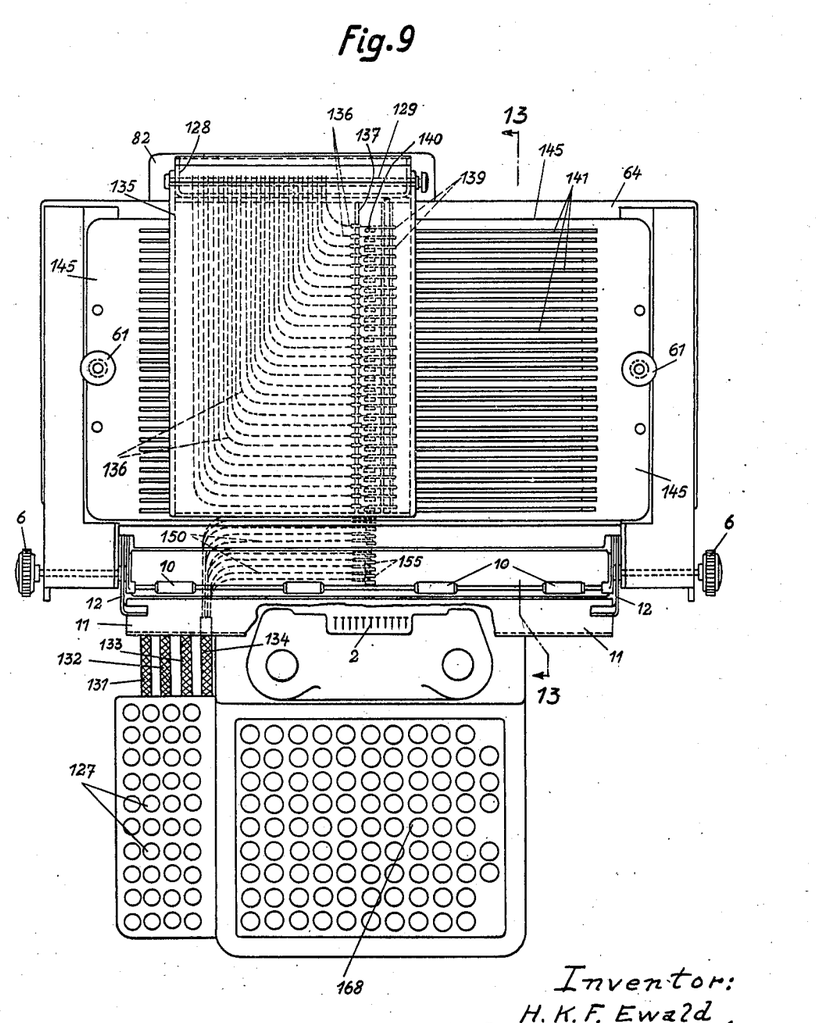
Fig. 9 is a plan of another embodiment, fitted to a calculating machine.
Figure 10:
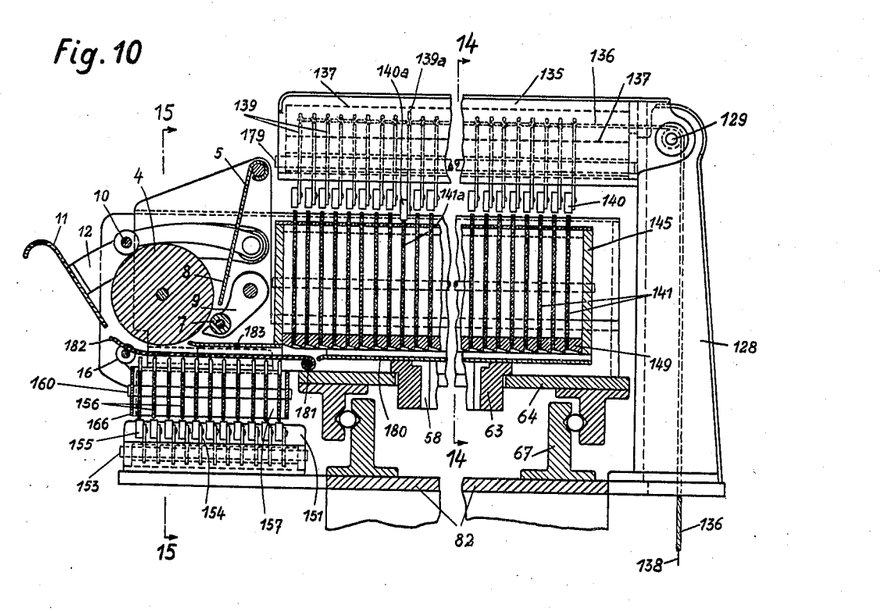
Fig. 10 is a section along the line 13—13 in Fig. 9.
Figure 11:
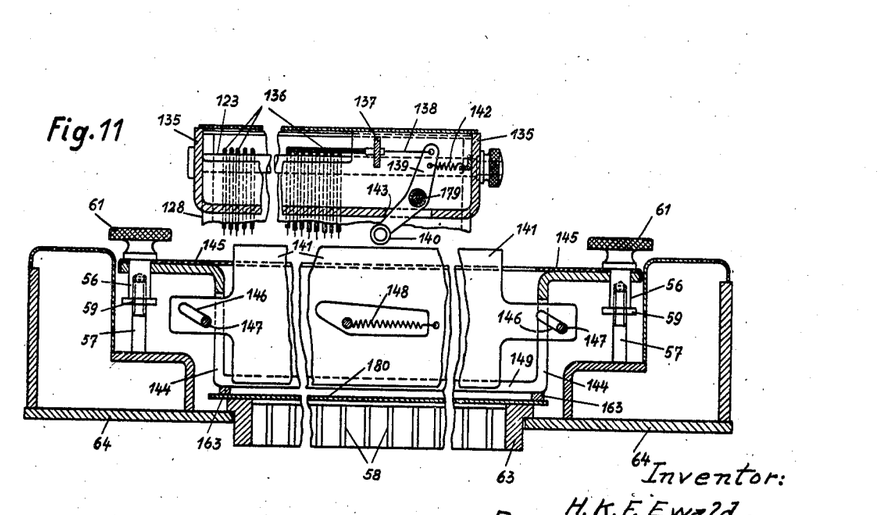
Fig. 11 is a section along the line 14—14 in Fig. 10.
Figure 12:
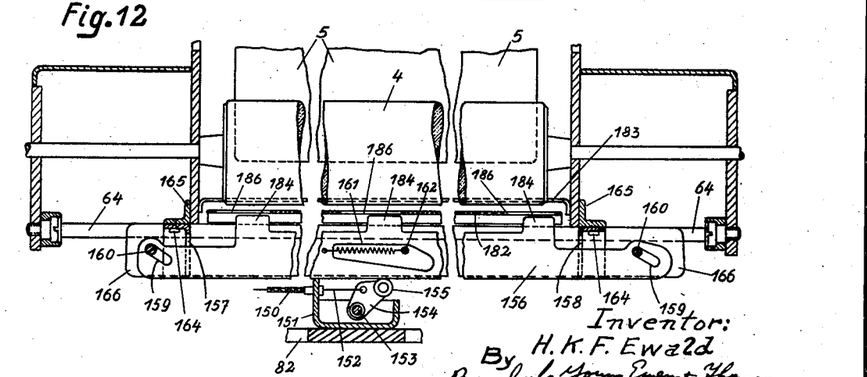
Fig. 12 is a section along the line 15—15 in Fig. 10.

Figs. 9–12 represent a further embodiment of the invention. In this case, stop bars 141 according to Figs. 9–11 and 156 according to Figs. 10–12 are arranged on a laterally movable paper carriage. In Fig. 9, the keys 127 allotted to the stop bars are mounted on the left of the keyboard 168 of the calculating machine. In this example the connection between the keys 127 and the stops 141, 156 is established by means of Bowden wires arranged in four groups 131–134 (Fig. 9). Three of these groups 131, 132 and 133 lead to a casing 128 (Figs. 9 and 10) mounted in rear of the paper carriage and thence, by way of an axis 129, to a housing 135 running horizontally over the paper carriage and adapted to tilt about the axis 129. In this housing 135, the ends of the sheathing 136 of each of the Bowden wires is attached (according to Fig. 11) to a rail 137 secured on the housing 135, whilst the ends of the Bowden wires 138 are connected to levers or transmission members 139. The members 139, which are rotatable about an axis 179, carry on their lower arms rollers 140 disposed (Figs. 10, 11) above stop bars 141. Moreover, by means of springs 142 engaging their upper arms, the members 139 can be pressed against stops 143 in order to keep the rollers 140 of such of the members 139 as are in the neutral position for the time being out of contact with the stop bars 141 moved with the paper carriage. In the present example, the transmission members (Fig. 9) are so arranged as to come into position about midway of the stop bars 141 when the paper carriage is in central position.

The ends of the stops 141 are guided in slits 144 in a guide member 145, and on rods 147 on the guide member 145 by slits 146. In the position shown, the stops 141 are drawn towards the right ends of the slits 146 by means of springs 148. By means of its under portion 149, which is provided with a plurality of slits for guiding the stop bars 141, the guide member 145 forms the upper boundary of a passage, the depth of which is determined by lateral fillets 163. The lower boundary of the passage is formed (Figs. 10, 11) by a bottom plate 180. The forward extension of the plate 180 consists of a plate 182 which is attached to a pin 181 and faces an upper plate 183.

By depressing any convenient key, the corresponding stop bar 141a can be depressed (Fig. 10) by means of the appropriate Bowden wire and transmission member 139a, so that it comes to bear on the bottom plate 180. As the result of this adjustment, a sheet of paper inserted at the feed plate 11 and platen 4, can be fed up to the lowered stop 141a.

The Bowden wires comprised in the cable 134 (Fig. 9) are attached (Fig. 12) with their guide sheaths 150 to a fixed holder 151. The corresponding Bowden wires 152 are connected to levers 154, which are rotatable about a fixed axis 153 and provided with rollers 155 (Figs. 9, 10 and 12). According to Fig. 10, the rollers 155 lie in the same plane as stop bars 156, which are guided by racks 157, 158 and by slits 159 and pins 160. They are kept drawn downwards by means of springs 161 (Fig. 12).

The stop bars 156 are provided with projections 184, which are held in a neutral position, in the same manner as in Fig. 5, below gaps 186 in a plate 182. By actuating a key, each stop bar 156, with its projections 184, can be moved obliquely upwards, through the agency of a Bowden wire 152 and a transmission member 154, in order to maintain the sheet that is to be inserted at the line desired for the time being in the passage 182, 183.

The pins or rods 160 and a rod 162 serving for the suspension of the springs 161, are disposed, together with the guide racks 157, 158, in a frame 166, which is detachably secured to brackets 165 on the paper carriage by means of screws 164.

The connection between the keys 127 and stops 141 or 156 is not restricted to Bowden wires, but can also be effected, for example, by means of electrical conductors, such as by employing electromagnets, or by any other convenient means. The keys 127 can also, of course, be equipped with a release device, after the manner of the release device 31, 39, 40 or similar means. The device according to the invention can also be designed in such a manner that the stops against which the sheets strike on insertion are located in front of the platen, in which event a feed plate corresponding to the plate 11 can be mounted at any other convenient position, for example in rear of the feed plate 5.

I claim as my invention:—

1. In calculators, typewriters, bookkeeping and similar machines a device for setting writing sheets to any desired line, comprising adjustable stops one for each line selective to be encountered by the writing sheets when fed and adjusting means, one for each stop, cooperating with said stops for bringing them into operative position.

2. A device according to claim 1, wherein the stop adjusting means are in the form of keys.

3. A device according to claim 1, wherein the stops are designed as bars.

4. A device according to claim 1, wherein the stops are formed by pins.

5. A device according to claim 1, wherein the stops when in operative position extend into a passage serving to guide the writing sheets.

6. A device according to claim 1, wherein the stops are constructed as bars and controlled by guides during their motion from inoperative to operative position.

7. A device according to claim 1, wherein the stop adjusting means are constructed as keys and laterally arranged in rows on the paper carriage.

8. A device according to claim 1, wherein the stop adjusting means are constructed as keys laterally arranged in rows on the paper carriage and interconnected by a common locking and releasing means for causing the release of previously adjusted keys by the depression of any desired key.

9. A device according to claim 1, wherein the stop adjusting means are constructed as keys laterally arranged in rows on the paper carriage and releasable by a common release member at the actuation of which all adjusted keys return to inoperative position.

10. A device according to claim 1, wherein the stop adjusting means are constructed as keys laterally arranged in rows on the carriage and connected with bell crank levers for transmitting the motion to the stops.

11. A device according to claim 1, wherein the stop adjusting means are constructed as keys laterally arranged in rows on the carriage and connected with bell crank levers for transmitting the motion to the stops and springs effect the return of the stops after release of the keys.

12. A device according to claim 1, wherein between the stops means having inclined surfaces guide the sheets.

13. A device according to claim 1, wherein between the stops means having inclined surfaces guide the sheets, said stops being withdrawn when in inoperative position between said sheet guiding means.

14. A device according to claim 1, wherein the stops in operative position extend into a sheet guiding passage and are arranged above said passage.

15. A device according to claim 1, wherein the stops cooperate with a sheet guiding passage and, preferably in the part located below the platen, are arranged below said passage.

16. A device according to claim 1, comprising at least one structural unit completely assembled having adjustable members and being detachable as a whole.

17. A device according to claim 1, comprising at least one structural unit completely assembled having adjustable members and being detachable as a whole and automatically acting blocking means for holding the adjustable members in position during removal and insertion of the structural groups.

18. A device according to claim 1, wherein the stop adjusting means are constructed as keys and one or several structural groups having adjustable and fixed members and being removable as a whole are provided and automatically acting blocking means hold the adjustable members in position during removal and insertion of the structural groups, said keys being contained in a removable structural group.

19. A device according to claim 1, wherein the stop adjusting means are constructed as keys, the stops being disposed on the paper carriage and the keys on a member that is not moved with the paper carriage.

20. A device according to claim 1, wherein the stop adjusting means are constructed as keys, the stops being disposed on the carriage and the keys near the machine keyboard.

21. A device according to claim 1, wherein the stop adjusting means are constructed as keys, the stops being disposed on the carriage and the keys forming part of the machine keyboard.

22. A device according to claim 1, wherein the stop adjusting means are constructed as keys operatively connected with the stops by Bowden wires.

23. A device according to claim 1, wherein the stop adjusting means are constructed as keys operatively connected with the stops by Bowden wires connected with adjustable transmission members whose motion is transmitted to the stops on the carriage.

24. A device according to claim 1, wherein the stop adjusting means are constructed as keys operatively connected with the stops by means connected with adjustable transmission members, said transmission members being mounted in a common housing.

25. A device according to claim 1, wherein the stop adjusting means are constructed as keys operatively connected with the stops by means connected with adjustable transmission members and intermediate means cooperating with said members for transmitting motion thereof to the stops, the points of application of the transmission members lying about midway of the intermediate means, when the paper carriage is in its central position.

26. A device according to claim 1, wherein the stop adjusting means are constructed as keys differing in spacing from the spacing of the stops.

27. A device according to claim 1, wherein a member is provided for covering control means adjusted to effect different functions of the machine, said covering member securing the control means in working position and being detachable with the device.

28. A device according to claim 1, wherein the stops, when in operative position, penetrate into gaps of the opposite walls of the sheet guiding passage to prevent the advance of writing sheets through the passage with certainty.

HEINRICH KONRAD FRIEDRICH EWALD.